United States Patent [19]
Eberhard et al.

[11] 3,866,199
[45] Feb. 11, 1975

[54] DEVICE FOR SCANNING A FUNCTION AND METHOD OF OPERATING THE SAME

[75] Inventors: Hans-Joachim Eberhard, Lomar; Knud Overlach, Karlsruhe; Gerd Hühne, Morsch; Ludwig Pietzsch, Karlsruhe, all of Germany

[73] Assignee: Ludwig Pietzsch, Karlsruhe, Germany

[22] Filed: Apr. 19, 1972

[21] Appl. No.: 245,573

[30] Foreign Application Priority Data
Feb. 9, 1972 Germany............................ 2206065
Apr. 19, 1971 Germany............................ 2118896
Feb. 28, 1972 Germany............................ 2209396

[52] U.S. Cl. ............................. 340/267 C, 250/202
[51] Int. Cl. ....................... G08b 21/00, B66c 15/00
[58] Field of Search..... 250/202; 340/267 C, 213 Q, 340/419; 33/23 H; 353/50

[56] References Cited
UNITED STATES PATENTS
| | | | |
|---|---|---|---|
| 2,410,550 | 11/1946 | Padva | 250/202 |
| 3,195,410 | 7/1965 | Colten et al. | 33/23 H |
| 3,362,022 | 1/1968 | Mork et al. | 340/267 C |
| 3,401,589 | 9/1968 | Druschel et al. | 250/202 |

Primary Examiner—Glen R. Swann, III
Attorney, Agent, or Firm—Herbert L. Lerner

[57] ABSTRACT

Device for tracking the image of a function including combination means for carrying at least one graphical representation of the pattern of a function; an optical image-forming system for the function including an image-viewing screen, a source of illumination, means forming a defined path of illumination between the source and the screen, means for interposing the pattern in the path between the source and the screen, a sensor for tracking the image of the pattern on the screen, means for effecting a relative movement between the image projected on the screen and the sensor according to respective variables of the function in relation to a fixed coordinate system; and method of operating the device.

13 Claims, 6 Drawing Figures

DEVICE FOR SCANNING A FUNCTION AND METHOD OF OPERATING THE SAME

BACKGROUND OF THE INVENTION

The invention relates to a device for scanning an image of a function, particularly that of a curve selected from a family of curves, by means of a sensor; and method of operating the same.

Two main modes of application of such apparatus are to be distinguished:

1. The simulation of a function. In this case, the sensor should follow as accurately as possible the image of the curve which serves as the sample curve.

Function generators, for instance, are used as curve trend calculators or time programmers for the monitoring, control and regulation of processes. In this connection, the scanning signal may be used as the command signal for a control circuit.

2. The formation of a threshold value. The sensor, in this case, moves as a function of one or more variables usually at a distance from the curve image serving as a threshold value graph.

An example of this second mode of application comprises an overload protection arrangement for derrick cranes. Here, the sensor is actuated as a function of the jib length, that is the projection of the distance between the boom-tip and the boom-pivot on the crane superstructure, and of the loading of the boom. If the loading limit which varies with the overhang is exceeded, a threshold value signal is set off, for instance one which disconnects a load-lifting mechanism and/or the boom-activation mechanism.

Known electrical arrangements of this type are expensive and do not permit the scanning of any given function with the desired precision. In known mechanical devices, the image of the curve is scanned as a profile, for instance, the profile of a cam or of the conductor portion on a conductor plate by means of a mechanical tracer. This mode of scanning suffers from friction and is therefore inaccurate. Due to the unavoidable wear, the tracked values undergo a change in the course of the service life of the known devices of this general type.

It is accordingly an object of the invention to provide method and device for scanning a function which avoids the foregoing disadvantages of the heretofore known method and devices of this general type.

With the foregoing and other objects in view, there is provided in accordance with the invention, device for scanning a function wherein a graphical representation of the function is inserted into the radiation path of an optical projection system and a photoelectric sensor is provided which is movable relative to the image of the graphical representation as a function of the variables of the function.

The apparatus constructed in accordance with the invention makes it possible to reduce considerably the technical effort in contrast to the known electrical or mechanical scanning arrangements. The device of the invention can scan curve images of any sort, i.e., also intermittent curves, which is not possible with heretofore known devices. It is also within the scope of the invention to be able to scan three-dimensional representations. The more usual application, however, is to be found in the scanning of two-dimensional curves. The sensor, in such a case is movable relative to the image in a plane parallel thereto wherein, of course, the displacement may be communicated to the sensor and/or the image in respect to a spatially pre-fixed coordinate system.

For the purpose described, the sensor is driven relative to the image in one of the main coordinate directions as a function of the independent variable of the represented function, and as a result of the deviation of the sensor from the representation of the curve or as the latter is traversed, a signal is released causing movement of the sensor or of the image in the other main coordinate direction.

Apparatus which is exclusively adapted to the simulation of a function, i.e., for the first application mode in accordance with the invention, is further evolved in that the sensor which is to be translated along the function to be simulated releases a signal due to any deviation from the curve so as to effect its return thereto.

The signal obtained from the sensor, as in the first application mode, may be used for the most diverse purposes. Thus, the signal or a value derived therefrom may be advantageously used to control, regulate or monitor. For example, the signal or a derivative value may comprise a command quantity for a control circuit. The signal or its derivative may also form the deviation error control in a control circuit, wherein the control magnitude is one of the variables comprising the function.

A device intended for the second application mode, is particularly suitable for providing a threshold value for the operational quantity of a process which changes with at least one of the physical quantities varying during the process, especially non-linearly, and which has limit values variable with a predetermined threshold value function of this quantity. In a further embodiment of the invention, the photoelectric sensor may provide a threshold value signal whenever the threshold value function represented in the image plane has been exceeded.

In an embodiment of the invention comprising "Lifting equipment," "process" comprises the lifting of a load, the "operational quantity" is a loading value, and the "physical quantity" is represented by a geometrical positional quantity of the lifting equipment. In the special application previously mentioned, for an overload protection, the operational quantity comprises the loading value of the load hanging from the boom and the physical magnitude comprises the overhang or jib length of the boom, that is the projection of the boom tip on the horizontal. The arrangement in accordance with the invention which is constructed to act as a threshold value generator may, however, also be used in other and most diversified fields. Further application possibilities comprise, for instance:

In braking systems for vehicles, the monitoring of the brake pressure in the brake fluid as a function of the vehicle velocity wherein a threshold value signal is generated as the threshold value for the braking pressure is attained, for instance, as a pressure limiter;

Monitoring of vehicle velocity in the case of tracked self-propulsion vehicles as a function of the track run wherein the exceeding of a velocity limit, predetermined for a given distance covered, triggers a threshold value signal whereby braking is actuated; and monitoring of the loading torque for power plants as a function of their rotational speed.

Greater accuracy is hereby attained because, in contrast to the heretofore known threshold value generators wherein the threshold value function for the operational quantity is simulated through the physical quantity as a polygon consisting of straight lines, in the case of the invention the precise threshold value function is provided optically in the form of a curve representation.

Preferably, in the second mode of application, the or any curve representation separates a transparent image portion from an opaque image portion. The sensor, as it traverses the curve which separates the two image portions will be disconnected. Naturally, more than a single curve may be represented on the curve image. For example, there may be present an early warning curve underneath the actual threshold value curve, during the traverse of which, an early warning signal may be triggered by the sensor. The surfaces on either side of each of the curves represented may have a different transparency to light and, depending upon the curve image by which a sensor is to be activated for the generation of a threshold value signal, the curve representation will be illuminated with a different intensity.

In an important embodiment which is equally suitable for both modes of application of the invention, provision is made for the radiation originating from the illuminated curve representation to be projected onto a frosted screen disposed in the field of observation of a monitoring operator and forming an image plane and that the sensor comprised of a photodiode is disposed adjacent to the frosted screen and is visible as a point of light or shadow in the image projected onto the frosted screen.

It is thus possible, in practice, without additional effort, to render visible to a monitoring operator the respective operating point or to have it recorded and stored, for example, by means of a motion picture camera. The monitoring operator thus sees the curve image of the function on the ground glass screen and the photoelectric sensor adjacent thereto as a point of light or shadow moving in relation thereto. He sees it, accordingly, as an operating point or actual state of the process which moves in accordance with the one variable or physical quantity in one direction, for example along the abscissa, and according to the other changing direction or operational quantity, in a direction normal thereto along the ordinate. In the second application, therefore, (for instance threshold value formation), the monitoring operator is thus in a position to estimate at a glance the distance of the instantaneous operational point or the actual condition of the process in respect to the threshold value. Such an indication in the case of the known devices would be realized only with disproportionately great technical effort.

In the device according to the invention, the relative motion between the photoelectric sensor and the radiation path originating from the illuminated graphical image may be realized in different ways. This relative motion is preferably realized by disposing in the radiation path between the graphical image and the statically disposed photoelectric sensor, a rotary mirror which is driven in dependence upon one of the variables of the function, and by moving the photoelectric sensor in dependence upon the other variables in the coordinate direction thereof. The rotary mirror, in this case, may be driven by the moving coil of an electrical meter in the manner of a mirror-galvanometer, or directly mechanically or in any other suitable manner.

The relative motion may also be realized in that a rotary mirror is rotatable in the radiation path between the graphic representation and the stationary photoelectric sensor about two mutually normal axes of rotation and, more particularly, about one rotational axis in proportion to one of the variables and about the other rotational axis in proportion to other variables.

A further possibility for obtaining relative motion between a photoelectric sensor and the radiation path provided by the illuminated curve image is provided by disposing two rotary mirrors in the radiation path between the graphic representation and the photoelectric sensor. These mirrors, for example, may be connected respectively with the moving coil of an electrical meter in the manner of a mirror-galvanometer, the deflection of one movable coil being proportional to one variable and the deflection of the other moving coil being proportional to the other variable.

The signal generator for one variable (for instance, the operational quantity) may actuate the mirror drive directly by mechanical means instead of through an electrical moving coil or some other servomotor.

The rotary mirror for other variables (for example, the physical quantity) may also be directly driven mechanically in porportion to its change.

It is also possible to effect a corresponding movement of the illuminating device or of the illuminated curve image.

In accordance with the invention, particular advantages are displayed when several different graphic representations are stored on an information carrier and, in dependence on selection of one or more parameters, are introduced into the radiation path between the illumination arrangement and the photoelectric sensor.

Derrick-type cranes, for example, usually have several rigging arrangements, for example, several different boom lengths or even modified boom structures. Each such rigging arrangement possesses a specific threshold value function for the jib length or overhang. Even such a multiplicity of load limit functions may be taken into account by a threshold value generator as described hereinabove.

An implementation of the concept just described, may be realized with a comparatively small number of parameters in that the information carrier comprises a rotatable disc arranged transversely to the radiation path, along the periphery of which the graphical representations are uniformly distributed in the form of a ring and may be selectively brought, by rotation of the disc, into an angular position corresponding to the respective parameter value, into the radiation path between the illumination arrangement and the photoelectric sensor.

A reed relay may be associated in such an arrangement with each of the graphical representations, and connected in circuit with the electrical control for the drive of the disc. The relay is energized upon the occurrence of the corresponding parameter value, and is switched off upon the insertion of the graphic representation corresponding to the parameter value into the radiation path by means of a magnet located adjacent to its path.

As in the case of a drum of a drum turret, the graphic images are automatically introduced into the radiation path originating with the illumination arrangement and are arrested at the correct position preferably by means of a simultaneously activated detent mechanism. The insertion of a threshold value function corresponding to the actual condition of the process is thereby assured in the simplest manner and with the least access time. Whenever the function, the operational magnitude, the variable or the physical magnitude are dependent upon a multiplicity of parameter values, the graphic images corresponding to the respective parameter values are made available in that the information carrier comprises a film strip which may be conveyed through and arrested in the radiation path between the illumination arrangement and the photoelectric sensor.

This form of optical storage of the function patterns is substantially cheaper than the storage in the form of plug-in boards with circuits arranged thereon, as they are usually provided in electrical threshold value signal generators. Thus, curve patterns of any desired kind that are also discontinuous curves may be stored very simply in an almost unlimited number and just the same, may be very simply and rapidly recalled and inserted into the radiation path of the optical projector system.

Examples of this second application mode of the embodiment of the invention just described, are provided by girder cranes or telescope cranes wherein the variable boom length provides a widely variable parameter greatly influencing the loading limit value. For the limit value transmitters used for this application, the simulation of the overhang or jib length by means of values measured for the boom length and the boom angle is required.

The provision of the expensive and troublesome jib length or overhang simulation may be wholly dispensed with by the use of a threshold value generator in accordance with the invention. For instance, in the case of cranes with variable boom lengths, as in telescope cranes, the boom length may be subdivided into any desired number of sub-divisions, for instance, every 10 or 20 centimeters, and at each division may be changed over automatically to a new threshold value function. Thus, an angle measurement along is sufficient whereby the variable boom lengths may be eliminated as an independent variable. Furthermore, through the fine sub-division of the boom lengths practically all troublesome quantities of the force measurement may be eliminated which might cause difficulties in a known threshold value generator.

The correlation between image and parameter value is operationally obtained by means of markings (numbering) on the respective film image characteristic for the corresponding parameter value as, for instance, the rigging arrangement of the crane. This correlation may be brought about automatically, but may, however, also be obtained manually through the action of the monitoring operator. Manual correlation may operationally take place in those cases wherein the number of the parameter values is very large and the automatic correlation can be obtained only at disproportionately great effort. In such cases, the monitoring operator attains the correlation, for example, by selecting a marking corresponding to the respective parameter value from a table or the like and manually actuates the film transport in order to locate on the film the graphical representation having the corresponding marking, and to insert it into the radiation path originating from the illuminating arrangement. In case of a sequential numbering of the parameter values and of the corresponding functions, this correlation may be facilitated by the fact that the monitoring operator at first, while still at considerable distance from the desired graphic representation in respect to the desired number, makes use of a rapid transport of the film and, only in the vicinity of the desired pattern, locates the desired image by means of a slow transport and then inserts it into the radiation path. In the case of the threshold value generator in accordance with the invention, a simple recording possibility is available for errors and accidents in that the screen image is photographed by means of a built-in film camera at the occurrence of certain threshold value conditions. Thus, for example, one or more still pictures may be initiated during the traverse of the early warning, at switch off and when there is a change in the curve pattern, respectively. Further instantaneously occurring parameters of the process may also be inserted into the screen image.

Other features which are considered as characteristic for the invention are set forth in the appended claims.

Although the invention is illustrated and described herein as device for scanning a function and method of operating the same, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawing.

DESCRIPTION OF THE PREFERRED EMBODIMENTS

Figure 1:
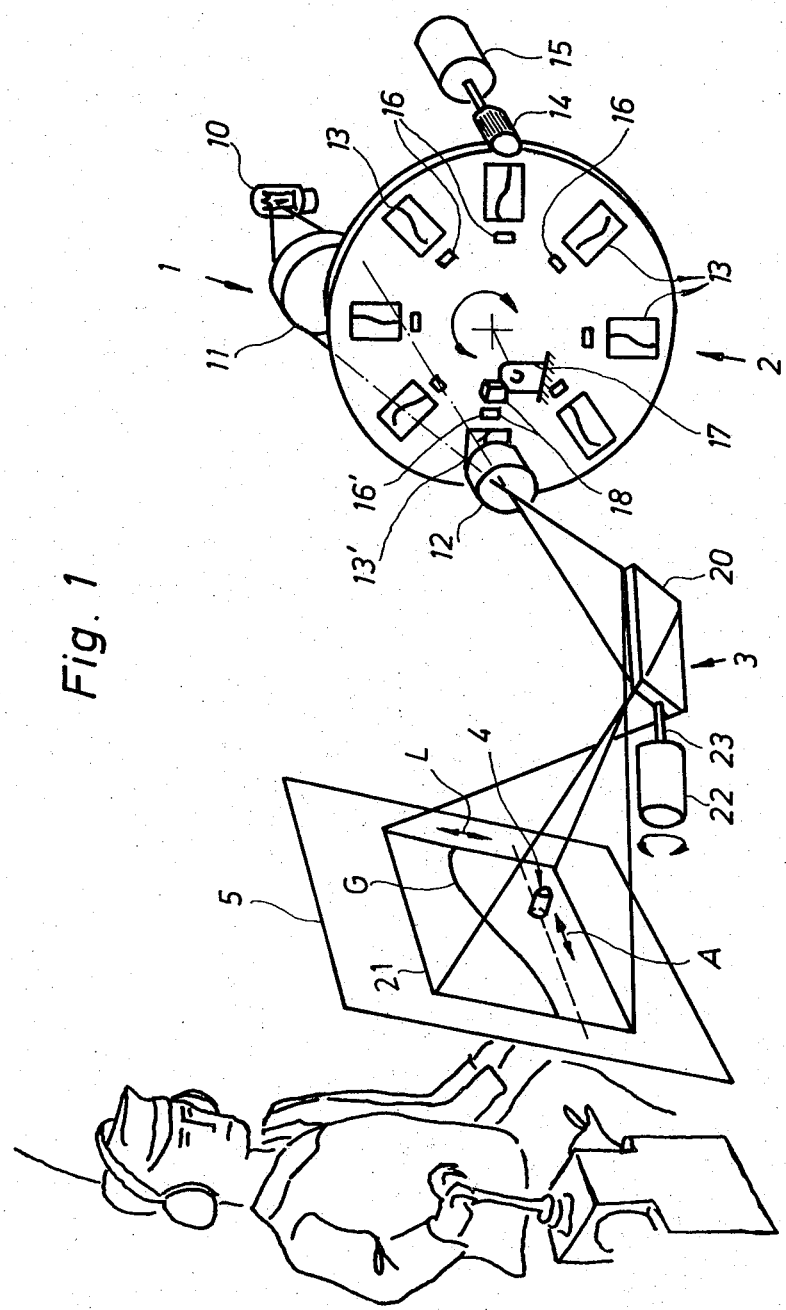
FIG. 1 is a schematic view of a threshold value generator constructed in accordance with the invention.

Referring now to the drawings, and first, particularly to FIG. 1 thereof, there is shown therein a threshold value generator according to the invention which, for example, forms part of an overload protection device for a derrick crane. The threshold value generator is made up of an illumination device 1, a rotary disc 2, serving as a carrier for the threshold value curve pattern, a rotary mirror device 3, a photoelectric sensor in the form of photodiode 4, and a frosted glass screen 5, which is disposed in the field of view of the monitoring operator, for example, the crane operator.

The illuminating device 1 includes a lamp 10 and a lens system made up of an illuminating lens device 11, disposed in front of the disc 2 and an objective lens 12 including projecting lenses, disposed behind the disc 2. The radiation beam originating from the lamp 10 and concentrated by means of the illumination lens device 11 penetrates the disc only when one of several of the transparent graphic representations 13, uniformly distributed over the circumference of the disc 2 has been inserted therein. Each of the graphic representations includes at least one curve which represents the maximum permissible loading limit value for the jib length or overhang of a respective rigging arrangement of a crane provided with the overload protection. The curve serves to separate an image portion transparent to light, which is disposed thereunder, from an image portion which is opaque.

The disc 2 is driven by a friction wheel 14 disposed adjacent its periphery, the friction wheel 14 being, in turn, driven by an electric driving motor 15. The disc 2 may also be driven by other means, for example, by a belt drive. With each graphic pattern 13 there is associated a reed relay 16 disposed on the disc 2. The reed relays, like the graphic representations 13, are arranged on the disc 2 in the form of a ring, i.e., spaced equal radial distances from the center of the disc 2. The reed relays 16 are connected into the electrical control circuit for the driving motor 15 which drives the frictional wheel, serving to rotate the disc. Upon the selection of a parameter value, for instance, for a given rigging arrangement of a derrick crane, the corresponding reed relay 16 is automatically energized while the other reed relays remain unenergized.

A magnet 18 is disposed adjacent to the disc 2 in rigid relationship to its journal 17 so that it may co-act with respect to the reed relay 16', which corresponds to the graphic image 13' inserted into the radiation path. The magnet 18 serves to switch off the reed relay 16' upon attainment of the inserted position so that the drive 15 of the friction wheel 14 is also shut off.

Upon the insertion of a graphic image 13' into the radiation path, the objective lens projects an image onto the rotary mirror 20 of the rotary mirror device 3, the rotary mirror 20, in turn, projecting an image 21 onto the frosted screen 5. The rotary mirror 20 is driven by the moving coil of an electric meter 22 which receives a current and is rotated in proportion to the change in the load value measured by the load generator, for example, the change in the total load moment applied to the crane. The rotary mirror 20 thus displaces the image in the direction of the arrow L. The photodiode 4 disposed behind the transparent frosted screen 5, is translatable by a non-illustrated drive in the direction of the arrow A, that is normally to the direction of the arrow L, in fact, as a function of a change in a physical magnitude, such as the overhang or jib length of the crane, for example. The light or shadow point provided by the photodiode 4 to the monitoring operator thus always indicates the actual condition of the crane in relation to the limit values represented by the curve G. As the curve G is overrun, the photodiode serves to deactivate the crane.

Figure 2:
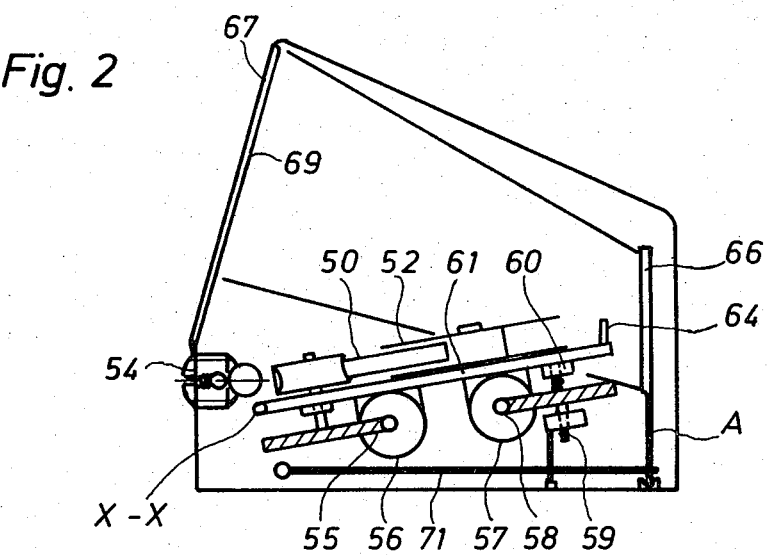
FIGS. 2 and 3 are plan and elevational views, respectively, of another embodiment of the threshold value generator of FIG. 1.
Figure 3:
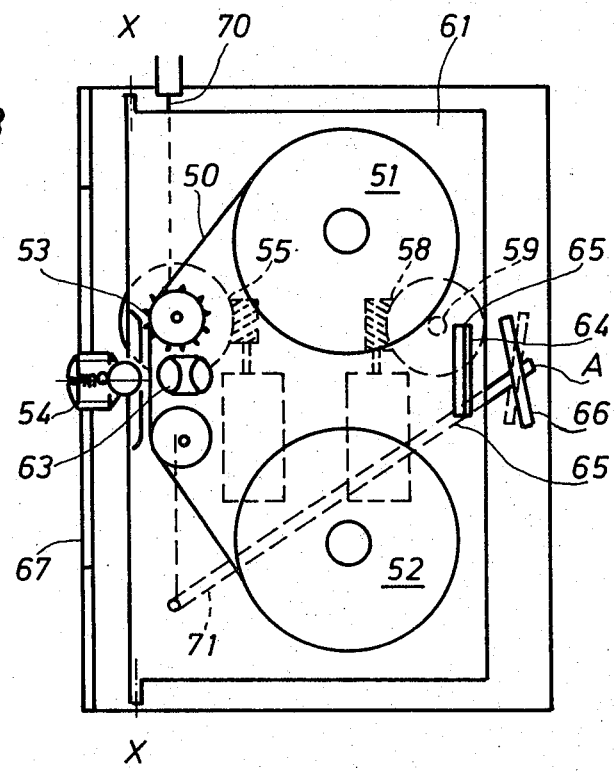

In the embodiment according to FIGS. 2 and 3, the rotating disc 2 has been replaced as a data carrier by means of a film strip 50. The film strip 50, in a conventional manner, is wound and unwound by means of reels 51 and 52 and is conveyed past a double filament lamp 54 by means of a film transport reel 53. The film transport reel 53 is driven by a worm drive 55 which, in turn, is driven by an electric motor 56. A second worm drive 58, driven by an electric motor 57, drives a threaded spindle 59 which cooperates with a nut 60 which is secured to a base plate 61 that carries film reels 51 and 52 and is pivotable about a rotary axis X—X. The electric motor 57 is driven in proportion to the change in the loading of the crane. In this manner, the graphic representation in the form of the film image disposed in front of the double-filament lamp 54 is pivotable about the horizontal axis X—X as a function of a change of an operational quantity or value, for example, the loading of the crane.

The radiation path emanating from the double filament lamp 54, after passing through an objective 63, impinges on a mirror 64 firmly affixed to the base plate 61 which is provided to the left and right-hand side thereof with two photodiodes 65 serving as image markers. The radiation further impinges on a larger rotating mirror 66 located behind the mirror 64 which is pivotable about the vertical axis A and serves to project an image onto a frosted screen 67. The film image is provided with a cross-hairs 68 (FIG. 4), a photodiode 69 being disposed in the center of the frosted screen 67.

The rotary mirror 66 is pivotable about the vertical axis A by means of a lever 61 which can be actuated by a Bowden cable 70. The Bowden traction is actuated in proportion to the overhang or jib length so that the rotation of the rotary mirror 66 about the vertical axis A leads to an horizontal displacement of the image projected onto the frosted screen 67 while the rotation of the base plate 61 about the axis X—X causes a vertical displacement of the image.

Figure 4:
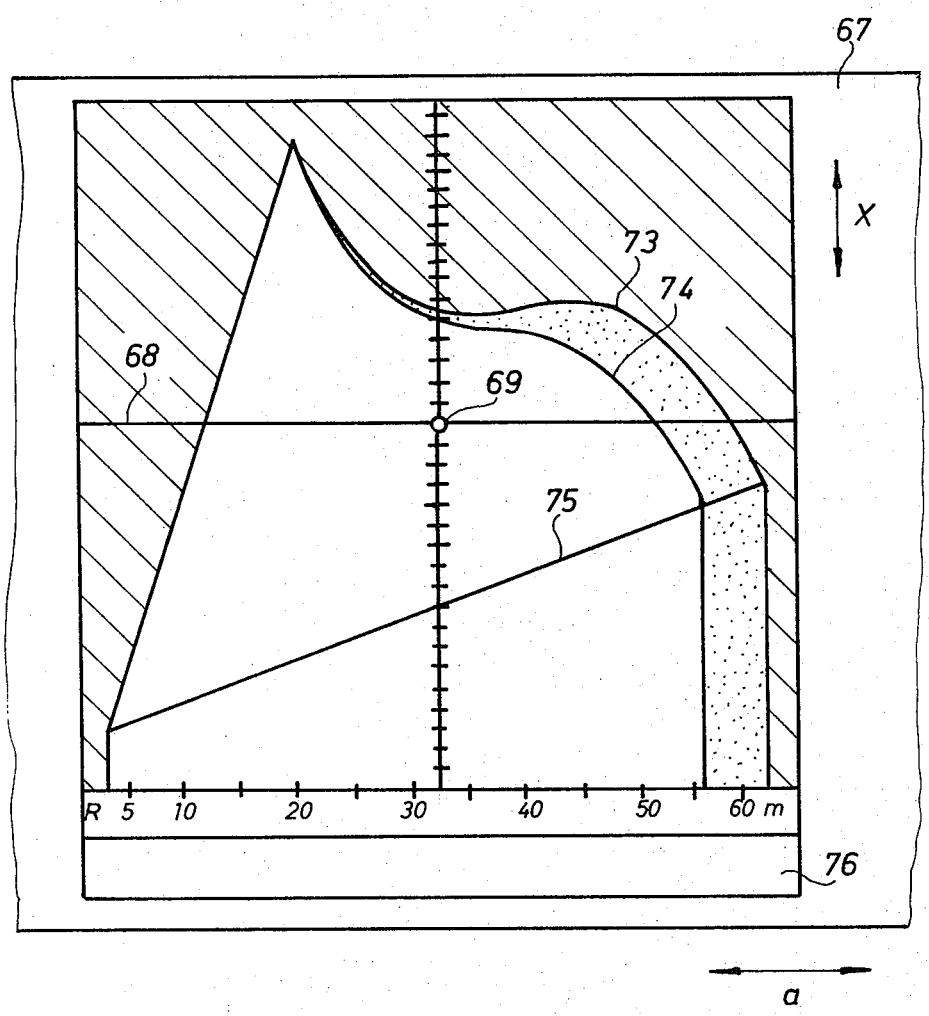
FIG. 4 is a diagrammatic view of a graphic representation as it is inserted into the radiation path of an optical projection system and is made visible on a frosted screen in accordance with the invention.

An example of the film image is shown in FIG. 4, as it is visible on the frosted screen 67. The image shows all three curves together, namely the curve 73 for an operational quantity such as the permissible loading moment of the crane, for example, in its front position; the curve 74 for an operational quantity subject to a modified process constant, such as the permissible loading moment of the crane, for example, in its lateral position; and the curve 75 for an operational quantity for a process constant further modified, such as, for example, a no-load jib length curve 75 for a crane under no-load. The cross-hatched surface above the curve 73 is opaque, the dotted surface between the curves 73 and 74 is weakly transparent to light, and the surface under the curve 74 is fully transparent thereto. With the aid of the cross-hairs of the film image, the correct adjustment of the overload protection device may be monitored, wherein the photodiode 69 located behind the frosted screen must coincide with the cross-hairs center or with the marking on the film image. The position of the photodiode relative to the film image indicates the instantaneous operating point, for example, the loading condition of the crane. In the no-load condition of the crane, the photodiode accordingly must coincide with a point on the no-load jib length curve 75. Should the crane then be subjected to load, the image will travel, in respect to the photodiode when a change in the operating point occurs, such as, for example, when a load is applied in the vertical direction X and when a change of a physical quantity occurs, for example, of the jib length in a horizontal direction a on the frosted screen. As the curve 73 or the curve 74 is traversed or over-run, a special threshold signal is triggered off depending on the selection of the light intensity.

At the lower edge of the image, there is provided a field for the abscissa legend value for the jib length or overhang R in meters, for example, and thereunder a field 76 for an explanatory legend, for example, suitable numbering which enbles the monitoring operator to locate the desired film image more rapidly.

Figure 5:
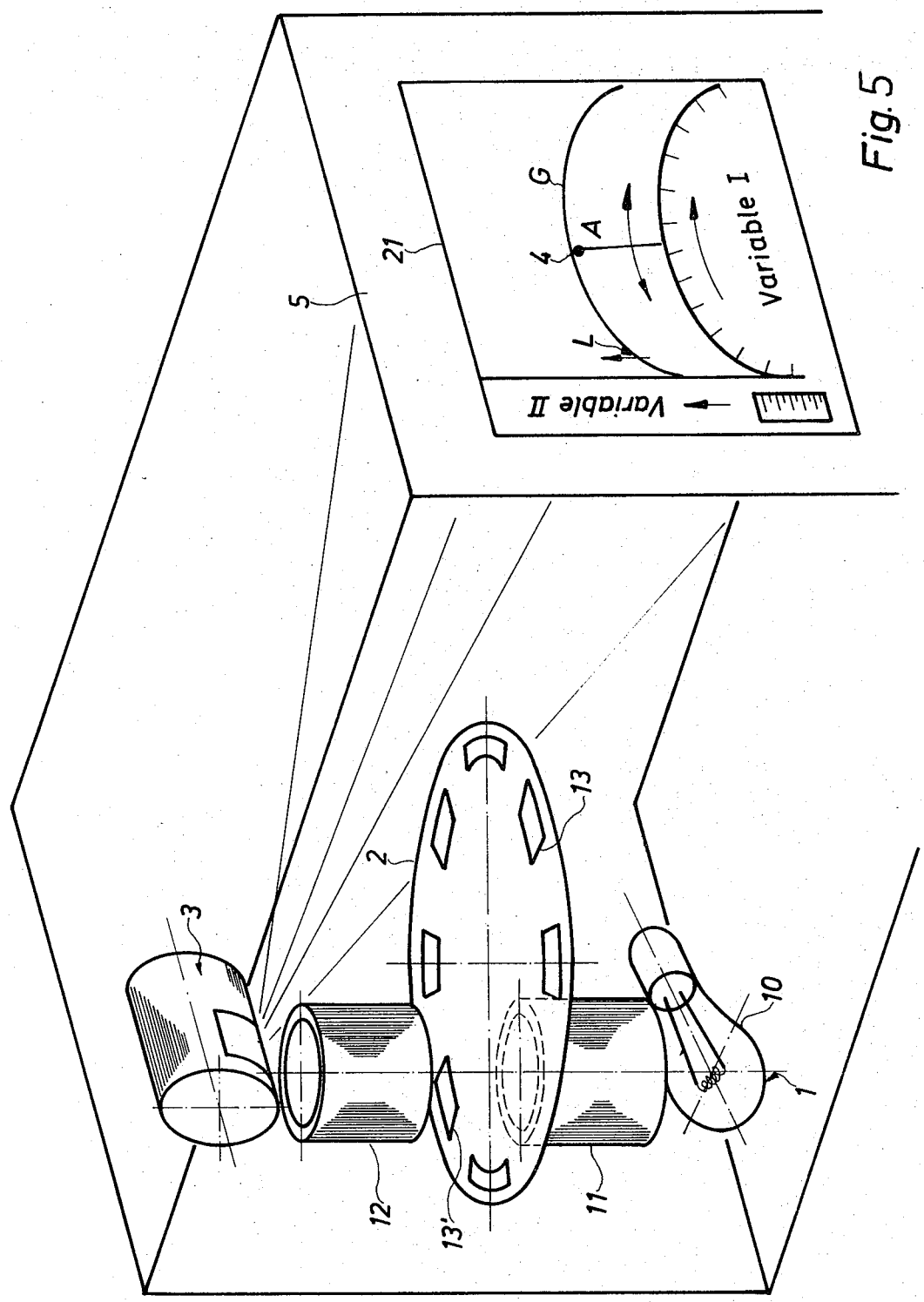
FIG. 5 is a diagrammatic perspective view of a presentation of a function generator constructed in accordance with the invention, several parts thereof which are non-essential to the invention having been omitted for the sake of improved clarity.
Figure 6:
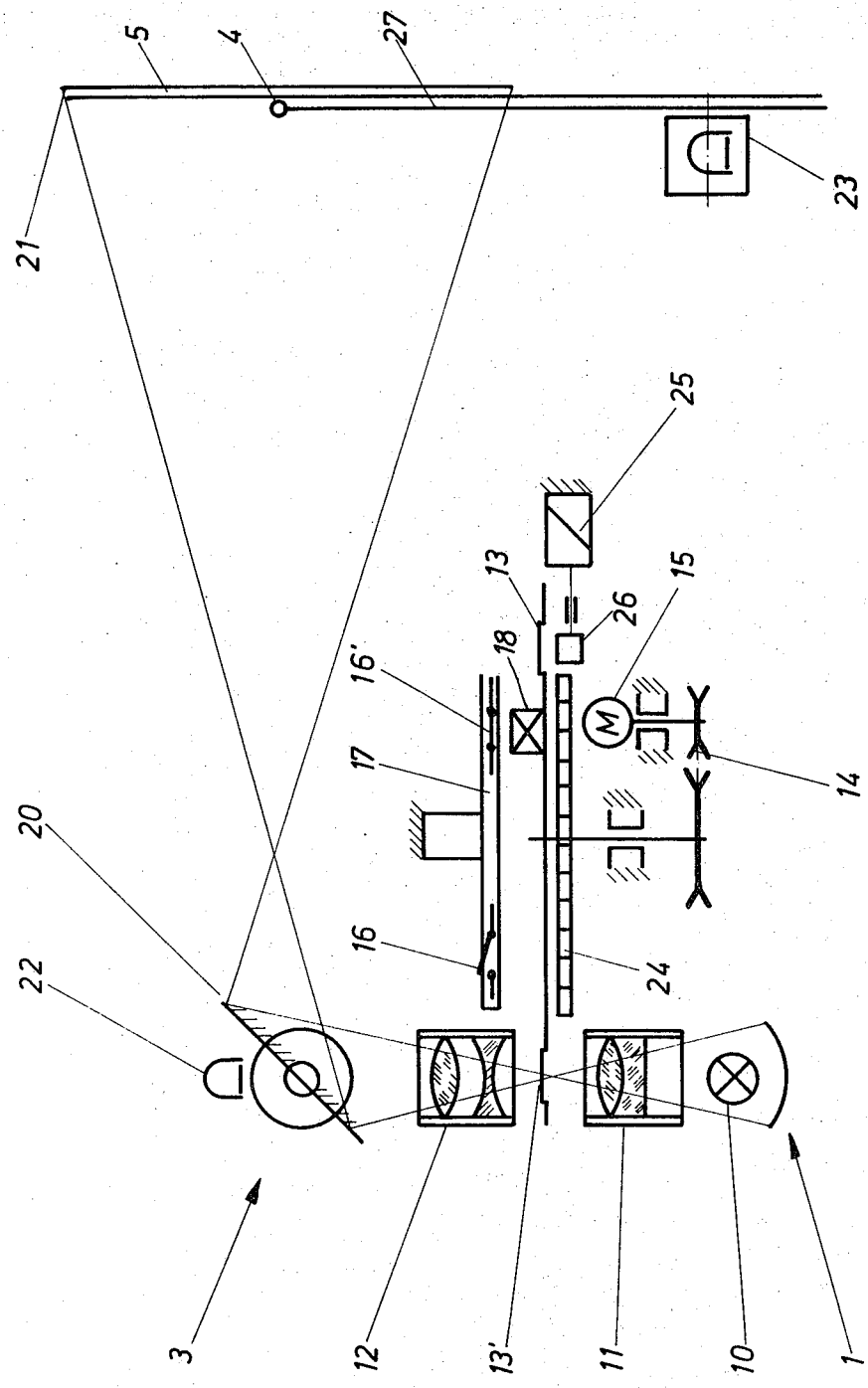
FIG. 6 is a schematic elevational view of the function generator of FIG. 5, with the housing thereof omitted.

The function generator shown in FIGS. 5 and 6, in principle, is constructed similarly to the threshold value generator shown in FIGS. 1 and 2. Those parts shown in FIGS. 1 and 2, on the one hand, and FIGS. 5 and 6, on the other hand, which have similar functions are identified by the same reference numerals.

The function generator primarily includes an illuminating device 1, a rotatable disc 2 which serves as a carrier for the curve representations which are to be scanned, a rotary mirror device 3, a photoelectric scanning device in the form of a photodiode 4 and a frosted screen 5 which may be disposed in the field of view of a monitoring operator in the pick-up range of a film or television camera.

The illuminating device 1 is made up of a lamp 10 and a lens system including an illumination lens device 11 disposed in front of the disc 2 and an objective 12 with projection lenses located behind the disc 2. The radiation path emanating from the lamp 10 and collected by means of illuminating lens device 11 penetrates the disc 2 only when there has been inserted into the radiation path one of the several transparent graph representations 13 uniformly distributed about the circumference of the disc 2. Each curve representation includes at least one curve which, for example, separates an image portion transparent to light from an image portion opaque to light.

The disc 2 is rotatable by a driving motor 15 through a belt drive 14. A reed relay 16 is associated with each graph representation 13, i.e. with each parameter quantity, and is located on a fixed selector disc 17 concentrically or coaxially disposed in relation to the disc 2. The reed relays, as well as the graph representations 13 disposed in the form of a ring on the selector disc 17, an equal radial distance from the disc center. The reed relays are connected into the electric control circuit of the driving motor. Upon the selection of a given parameter magnitude, the associated reed relay 16 is automatically energized while the other reed relays remain unenergized.

A permanent magnet 18 is mounted on the disc 2 so that it may cooperate with the respective reed relay 16' which corresponds to the curve pattern 13' inserted into the radiation path. The magnet 18 switches off the reed relay 16' upon the attainment of the inserted position so that the drive motor 15 is also turned off. Simultaneously, a detent device 25 is actuated which locks or blocks the disc 2 in the inserted position of the curve pattern 13'. The detent 25 is formed with a pawl 26 which may be moved against the geared rim serving to lock the disc. Upon the insertion of a curve pattern 13' into the radiation path, the objective lens projects an image onto the rotary mirror 20 of the rotating mirror device 3 which, in turn, projects an image 21 onto the frosted screen 5. The rotary mirror 20 is driven by the movable coil of the electric meter 22, which is energized directly through a signal given off by the sensor 4 as a result of its deviation from the curve pattern, or is energized by means of a positioning signal from a control circuit derived from a signal of the sensor 4, and is turned so that the image is displaced in either direction of the arrow L so as to cancel the deviation on the frosted screen 5. The photodiode 4 located behind the transparent frosted screen 5 is mounted on the tip of an indicator 27 which is rotatable by an electric measuring device 23 in the direction of the arrow A and, in fact, acts as a function of the independent variable of the represented curve function. This may be any physical quantity depending upon the nature of the use thereof, such as time, for example.

We claim:

1. Device for tracking the image of a function, comprising in combination carrier means for carrying at least one graphical representation of the pattern of a function, said carrier means including a rotary disc and a plurality of pattern representations disposed thereon about the circumference thereof, means for driving said rotary disc, and means for energizing said driving means with a signal representative of one variable of said function; an optical image-forming system for said function including an image-viewing screen, a source of illumination, means forming a defined path of illumination between said source and said screen, means for interposing said pattern in said path between said source and said screen, and means for displaying an image of said pattern on the screen; and a sensor operable to sense the image of the pattern on said screen; and means for effecting a relative movement between the image projected on the screen and said sensor according to variables of said function in relation to a fixed coordinate system.

2. Device according to claim 1 wherein said movement effecting means includes means for driving said sensor relative to the image in one principal coordinate direction in accordance with the independent variable of said function, and further including means for deriving a correctional signal from the movement of said sensor, and means for applying said correctional signal to said sensor driving means whereby said sensor reverses its movement in respect to one principle coordinate.

3. Method for operating the device of claim 1 in connection with load hoisting for signalling the overrunning of a threshold limiting value as for an operating quantity of a process which is variable with at least one physical quantity subject to change during the process, comprising the step of optically displaying said threshold limiting values, operating a sensor relative to said displayed values, and providing a threshold value signal by the sensor in response to an overrunning of said threshold value function by said sensor.

4. Method according to claim 3, wherein said operating quantity comprises a loading quantity and the physical quantity is a geometric quantity indicative of the operating position of the hoisting apparatus.

5. Method according to claim 4 applied as an overload protection for a derrick-type crane having generators for providing signals indicative respectively of crane loading and crane overhang, wherein the operating quantity is the crane load and the physical quantity is the crane jib length.

6. Method according to claim 5 including the step of obtaining signals in response to overruns thereof by said sensor for use as early warning and disconnect signals.

7. Device according to claim 1 wherein there is included a rotary mirror disposed between said graphical representation and said sensor, said sensor being a photoelectric device.

8. Device according to claim 1 wherein said movement effecting means includes two rotatable mirrors disposed between said graphical representation and said sensor, the sensor being a photoelectric device, the mirrors being respectively pivotable in response to one and a second variable.

9. Device according to claim 1 wherein said sensor is a photoelectric device, and said representation comprises a graph separating image portions having different transparencies to light.

10. Device according to claim 1 wherein said sensor is a photoelectric device and said representation includes a plurality of graphs which respectively separate image portions having different transparencies to light.

11. Device according to claim 1, including means for selecting one of said graphical representations on said carrier means for disposition in said defined path.

12. Device according to claim 11, wherein said means for selecting includes a reed relay in association with a respective pattern representation, electrical means for driving said carrier, said relay controlling said electrical means, means for energizing said relay in response to the selection of given parameters corresponding to a representation, a magnet in said device disposed to inactivate said selected relay, and means for stopping said carrier at the selected position for the representation in response to said relay being deactivated.

13. Device for tracking the image of a function, comprising in combination carrier means for carrying at least one graphical representation of the pattern of a function including a film strip having a plurality of pattern representations disposed thereon; an optical image-forming system for said function including an image-viewing screen, a source of illumination, means forming a defined path of illumination between said source and said screen, means for interposing said pattern in said path between said source and said screen, and means for displaying an image of said pattern on said screen; and a sensor operable to sense the image of the pattern on said screen; and means for effecting a relative movement between the image projected on the screen and said sensor according to variables of said function in relation to a fixed coordinate system.

* * * * *